Sept. 18, 1962   B. A. FLODMAN   3,054,564
WATER DIVERSION GUIDE
Filed May 9, 1961

INVENTOR
BURDETTE A. FLODMAN

BY *Beale and Jones*

ATTORNEYS

United States Patent Office 3,054,564
Patented Sept. 18, 1962

3,054,564
WATER DIVERSION GUIDE
Burdette A. Flodman, Rte. 2, Stromsburg, Nebr.
Filed May 9, 1961, Ser. No. 108,823
4 Claims. (Cl. 239—502)

This invention relates to a water diversion guide for use with irrigation pipes.

In irrigating large tracts of land, it is the practice to provide main feeder pipes which conduct the water from the source of supply to distribution points. The water may then be distributed to the area to be irrigated by means of branch pipes connected to the feeder pipe. The branch pipes are provided, at spaced intervals therealong, with liquid delivery openings. Each of the openings is provided with a closure means such as a gate, valve or plug by means of which the supply of water to an area may be controlled. The delivery openings are usually located on the sides of the pipes and allow the water to discharge into the area to be irrigated or into distribution trenches or furrows in a solid stream and with considerable force. Due to the force of this solid stream of water, the ground in the immediate vicinity of the outlets is subject to undesirable erosion resulting in the formation of pools of water which may become stagnant. Moreover, the force of this direct stream of water may also erode the distribution trenches or furrows. Furthermore, those trenches immediately in front of the port receive more water than the trenches to the sides of the port, thus resulting in an uneven distribution of water.

It is an object of this invention to provide a device which will deflect the water emanating from a peripheral irrigation port in an irrigation pipe thus avoiding erosion of the area immediately adjacent the port. It is a further object of this invention to provide a device for use on an irrigation pipe which will divert the water which is discharged through delivery openings either to the left or the right or in both directions, as desired, so as to provide more selectivity and greater control of the area to be irrigated and to insure more uniform distribution of the water to various portions of the area to be irrigated. It is still another object of this invention to provide such a device which may be easily and quickly attached to and removed from an irrigation pipe.

The foregoing objects are achieved by this invention which, briefly, comprises a baffle which has a flat main portion and an edge which is deflected to form a flanged edge. The side of the baffle which is adjacent to the flanged edge is joined to a pipe engaging means. The pipe engaging means may be in the form of a U-shaped clip which is of a size suitable to compressively engage an irrigation pipe and hold the baffle in the desired position relative to the water discharge opening.

The preferred embodiment of this invention will be more particularly described with reference to the accompanying drawings wherein.

The drawings are more fully explained hereinafter with particular reference to the various numerical designations, each individual numeral having the same significance in the different figures.

Figure 1:
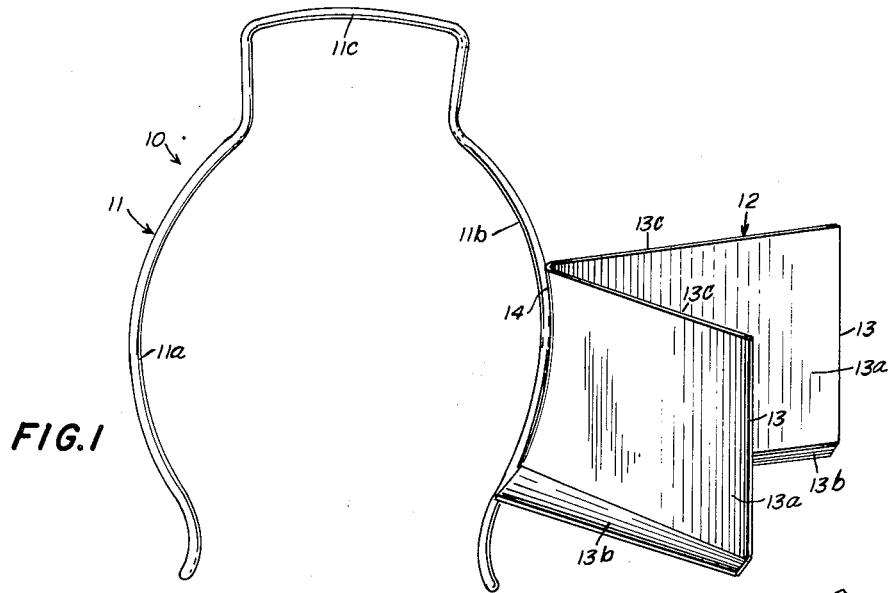
FIGURE 1 is a perspective view of a water diversion guide constructed according to this invention.

Referring to the drawings in detail, FIGURE 1 shows a water diversion guide 10 which comprises a clip 11 and a V-shaped diversion member 12. The clip 11 preferably has a pair of curved legs 11a and 11b which are adapted to compressively engage an irrigation pipe. The legs 11a and 11b are connected by means of a raised handle portion 11c. Obviously, the shape of the clip 11 may vary somewhat and its size will be dependent upon the diameter of the pipe to which it is to be attached.

The diversion member 12 comprises a pair of baffles 13—13 which are joined, one to the other, at a common side 14 to form a V-shaped member. The diversion member 12 is joined to the leg 11b of the clip 11 along the side 14 of the baffles 13—13—i.e. the V-shaped diversion member is joined to the clip along the base of the V. Each of the baffles 13—13 has a flat main portion 13a and a deflected or flanged edge 13b adjacent the side 14. The deflected edge 13b is formed by bending one side of the baffle to form an obtuse angle, preferably an angle of about 45 degrees. The deflected or flanged edge 13b maintains the diversion guide 10 in a stable position on an irrigation pipe and also serves to channel the water in the desired direction. The edge 13c opposite the deflected edge 13b may also be deflected. The baffle 13 may be of various sizes and both the length and the width of each baffle may be changed considerably. It is preferable that the baffle be square or rectangular in shape. It has been found that baffles which are each four inches high by four inches wide are satisfactory.

Figure 2:
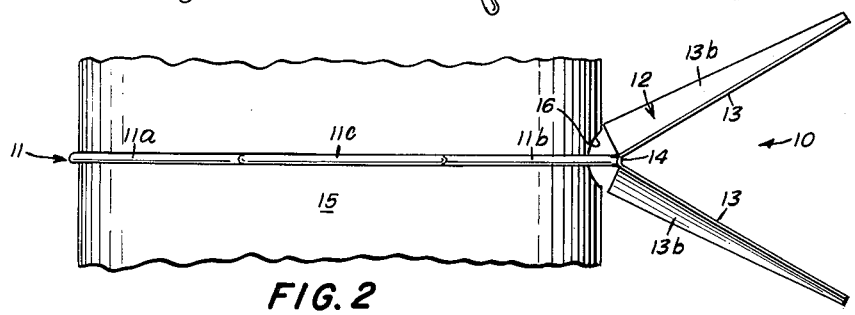
FIGURE 2 is a top elevational view of a water diversion guide constructed according to this invention in association with an irrigation pipe.
Figure 3:
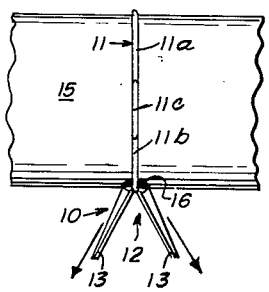
FIGURES 3, 3a and 3b are top elevational views of water diversion guides constructed according to this invention in association with an irrigation pipe and showing how the guide may be positioned to divert water emanating from a discharge opening.
Figure 3A:
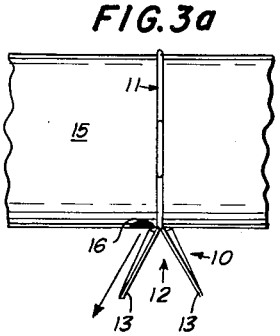
Figure 3B:
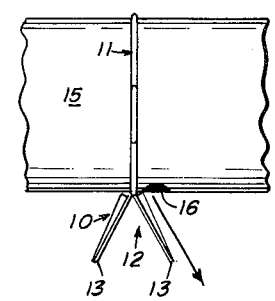

As shown in FIGURE 2 when the water diversion guide 10 is in use, the clip 11 compressively engages the irrigation pipe 15. Legs 11a and 11b at least partially surround the pipe 15 on opposite sides thereof. The V-shaped diversion member 12 projects outwardly from the pipe 15. The deflected edges 13b—13b, which are located at the bottom of the diversion member 12, rest against the pipe and maintain the diversion guide 10 in a stable position. As shown in FIGURES 3, 3a and 3b, the water diversion member 12 may be located either directly over or to the right or to the left of the water discharge opening 16 in the pipe 15 according to which direction it is desired to deflect the water. When the closure means, such as a gate or plug, for the opening 16 is opened, water emanating from the pipe 15 through the water discharge opening 16 will be diverted by the baffles in the directions shown by the arrows in FIGS. 3, 3a and 3b, and the flanged edge 13b, which is preferably wider adjacent the side 14 which is joined to the clip 11 than at the opposite side, channels the water outwardly in a direction away from the pipe 15. Thus, in FIG. 3, wherein the water diversion guide 10 is located directly over the opening 16, the water is diverted both to the left and to the right of the line perpendicular to the longitudinal axes of the pipe 15. In FIG. 3a, wherein the water diversion guide 10 is located to the right of the opening 16, water will be diverted to the left and in FIG. 3b, wherein the water diversion guide 10 is located to the left of the opening 16, water will be diverted to the right.

The water diversion guide 10 may be moved from one position to another on the pipe 15 by simply grasping the handle 11c and disengaging the clip 11 from its position on the pipe 15 by pulling upwards. It may be placed in a new position by placing one free end of each of the legs 11a and 11b on both sides of the pipe and then pushing down on the handle.

By the use of a water diversion guide constructed according to this invention, it is possible to divert the water emanating from an irrigation pipe in the desired direction as needed, thereby assuring greater control over the area to be irrigated and thereby avoiding wasting water on areas which are less in need of water.

I claim:

1. In combination, an irrigation pipe having at least one peripheral water discharge opening in the lateral surface thereof; and a water diversion guide comprising at least one baffle, the main portion of said baffle being flat, said baffle having an edge deflected to form a flanged edge, said baffle being joined by means of a side adjacent said flanged edge to a resilient engaging means, said resilient engaging means comprising a pair of curved members which are connected by means of a raised handle portion, said resilient engaging means compressively engaging said irrigation pipe and holding said baffle stationary at a point cooperable with said water discharge opening to divert water emanating from said opening.

2. In combination, an irrigation pipe having at least one peripheral water discharge opening in the lateral surface thereof; and a water diversion guide comprising a pair of baffles, the main portion of each of said baffles being flat, each of said baffles being joined, one to the other, by means of a common side to form a V-shaped member, each of said baffles having at least one edge adjacent said common side deflected to form a flanged edge, said V-shaped member being attached by means of said common side to a resilient engaging means, said resilient engaging means compressively engaging said irrigation pipe and holding said V-shaped member stationary at a point cooperable with said water discharge opening to divert water emanating from said opening.

3. The combination according to claim 2 wherein said resilient engaging means comprises a pair of curved members which compressively engage said irrigation pipe, said curved members being connected together by a grasping means which extends above the plane of said irrigation pipe.

4. In combination, an irrigation pipe having at least one peripheral water discharge opening in the lateral surface thereof; and a water diversion guide comprising a pair of baffles, the main portion of said baffles being flat, each of said baffles having an edge deflected to form a flanged edge, each of said baffles being joined by means of a side adjacent said flanged edge to a resilient engaging means, said resilient engaging means comprising a pair of curved members which are connected by means of a raised handle portion, said resilient engaging means compressively engaging said irrigation pipe and holding said baffles stationary at a point cooperable with said water discharge opening to divert water emanating from said opening.

References Cited in the file of this patent

UNITED STATES PATENTS

| | | |
|---|---|---|
| 564,906 | Van Camp | July 28, 1896 |
| 890,044 | Godbey | June 9, 1908 |
| 932,618 | Kunz | Aug. 31, 1909 |
| 2,213,405 | Paddock | Sept. 3, 1940 |
| 2,298,765 | Johnson | Oct. 13, 1942 |
| 2,658,582 | Wintermute | Nov. 10, 1953 |
| 2,701,165 | Bete et al. | Feb. 1, 1955 |